(12) United States Patent
Ganesan et al.

(10) Patent No.: US 11,887,347 B2
(45) Date of Patent: Jan. 30, 2024

(54) DEVICE-TO-IMAGE REGISTRATION METHOD, APPARATUS, AND STORAGE MEDIUM

(71) Applicant: Canon U.S.A., Inc., Melville, NY (US)

(72) Inventors: Santosh Narayan Ganesan, Brookline, MA (US); Barret Daniels, Cambridge, MA (US)

(73) Assignee: Canon U.S.A., Inc., Melville, NY (US)

(*) Notice: Subject to any disclaimer, the term of this patent is extended or adjusted under 35 U.S.C. 154(b) by 82 days.

(21) Appl. No.: 17/377,191

(22) Filed: Jul. 15, 2021

(65) Prior Publication Data
US 2022/0044057 A1 Feb. 10, 2022

Related U.S. Application Data

(60) Provisional application No. 63/062,227, filed on Aug. 6, 2020.

(51) Int. Cl.
G06K 9/00 (2022.01)
G06V 10/22 (2022.01)
(Continued)

(52) U.S. Cl.
CPC ............ *G06V 10/225* (2022.01); *G06F 18/22* (2023.01); *G06V 10/40* (2022.01)

(58) Field of Classification Search
CPC ..... G06K 9/6201; G06V 10/225; G06V 10/40
See application file for complete search history.

(56) References Cited

U.S. PATENT DOCUMENTS 10,157,452 B1 * 12/2018 Tighe .................... G06T 5/006
10,420,626 B2 * 9/2019 Tokuda ................... G06F 18/22
(Continued)

FOREIGN PATENT DOCUMENTS

CA      2958624 A1 *  4/2017  ............ A61B 34/20
JP    2018529399 A    10/2018
(Continued)

OTHER PUBLICATIONS

Application accuracy in frameless image-guided neurosurgery: a comparison study of three patient-to-image registration methods, Peter A Woerdeman et al., J Neurosburg 106, 2007, pp. 1012-1016 (Year: 2007).*

*Primary Examiner* — Jayesh A Patel
(74) *Attorney, Agent, or Firm* — Canon U.S.A., Inc. IP Division

(57) ABSTRACT

A device to image registration method includes obtaining image data of a device, the device including a plurality of fiducials arranged as a fiducial frame on the device; detecting fiducial objects within the image data; cropping the image data to generate cropped image data; applying a feature enhancement to the cropped image data to enhance the fiducial objects; generating a candidate list of candidate objects based on the feature enhancement, and determining a common plane based on at least three points in the candidate list; determining a representative point for each candidate object; determining outlier candidate objects based on the common plane; determining resultant objects by extracting the outlier candidate objects from the candidate list; and registering the resultant objects to the device by matching the representative points of the resultant objects with a model of the fiducial frame.

24 Claims, 21 Drawing Sheets

(51) Int. Cl.
    *G06V 10/40*          (2022.01)
    *G06F 18/22*          (2023.01)

(56)               References Cited

U.S. PATENT DOCUMENTS

| | | | |
|---|---|---|---|
| 10,893,911 B2* | 1/2021 | Daniels | A61B 5/055 |
| 11,202,652 B2* | 12/2021 | Tokuda | A61B 90/11 |
| 11,295,471 B1* | 4/2022 | Bhuta | H04N 7/183 |
| 2006/0173269 A1* | 8/2006 | Glossop | A61B 5/06 |
| | | | 600/407 |
| 2010/0284572 A1* | 11/2010 | Lukas | G06T 7/251 |
| | | | 340/988 |
| 2011/0102817 A1* | 5/2011 | Hoover | H04N 1/506 |
| | | | 358/1.9 |
| 2012/0259204 A1 | 10/2012 | Carrat et al. | |
| 2017/0000581 A1* | 1/2017 | Tokuda | G06V 10/40 |
| 2019/0046232 A1* | 2/2019 | Tokuda | A61B 90/11 |
| 2019/0095742 A1* | 3/2019 | Fujimori | G06T 7/74 |
| 2019/0159844 A1* | 5/2019 | Daniels | A61B 5/055 |
| 2019/0295277 A1* | 9/2019 | Kobayashi | H04N 9/3185 |
| 2020/0121219 A1* | 4/2020 | Ganesan | A61B 90/11 |
| 2020/0121392 A1* | 4/2020 | Daniels | A61B 34/25 |

FOREIGN PATENT DOCUMENTS

| | | | | |
|---|---|---|---|---|
| JP | 2019076693 A | * | 5/2019 | ......... A61B 17/3403 |
| JP | 2019076693 A | | 5/2019 | |
| JP | 2020096796 A | | 6/2020 | |
| WO | WO-2008085163 A1 | * | 7/2008 | ........... G01B 11/002 |
| WO | WO-2016134093 A1 | * | 8/2016 | ........... A61B 5/0077 |
| WO | WO-2017003453 A1 | * | 1/2017 | ............. A61B 90/39 |
| WO | WO-2018006168 A1 | * | 1/2018 | ............. A61B 34/20 |

\* cited by examiner

DEVICE-TO-IMAGE REGISTRATION METHOD, APPARATUS, AND STORAGE MEDIUM

CROSS REFERENCE TO RELATED APPLICATIONS

The present application claims the benefit of priority from U.S. Provisional Application No. 63/062,227 filed Aug. 6, 2020, which is hereby incorporated by reference herein in its entirety.

BACKGROUND

Field of the Disclosure

The present disclosure generally relates to image processing and automated processes for device-to-image registration using fiducial markers and, more particularly, to a device-to-image image registration method, apparatus, and storage medium.

Description of the Related Art

Fiducial markers or fiducials are helpful to correlate or register positions of images with physical locations of objects. In medical applications, fiducials enable medical personnel to compare or determine relationships between actual locations of patients with images of the locations at a distance. Medical applications include, for example, surgery, dentistry, radiation therapy, orthopedics, or the like. Medical personnel include, for example, doctors, physicians, nurses, technicians, or the like. Fiducials may include, for example, markers, point locations, characteristics, initialization parameters, or the like. Fiducials may be small objects in the shape of circles, triangles, ellipses, spheres, coils, cylinders, or the like. The objects may be fabricated from material including metal, such as gold or the like. Fiducials may be placed near a medical area, such as a tumor or the like, to help guide the placement of radiation beams, tools, needles, or the like, during treatment or operations.

Interventional guidance configurations such as computed tomography (CT), magnetic resonance imaging (MRI), or the like, may be used to guide medical therapies to internal areas of patients. Accurate and rapid detection of high intensity fiducials in medical images for automatic device-to-image registration is desirable for interventional guidance configurations. Within a clinical context, interventional guidance techniques preferably take place reasonably quickly, e.g., within the order of seconds or less.

Current approaches that address this challenge are shown in FIGS. 15-19 and described in U.S. Pat. Nos. 10,420,626 and 10,893,911, and assume that most of the candidates for possible fiducials are real fiducials. However, due to the presence of noise within the image, and artifacts coming from various sources, this assumption may not be correct. This may result in a less than optimal solution for device to image registration. An optimal solution may be represented as a transformation of the device from physical space to image space, that may result in the lowest Root Mean Error, detection of the highest possible number of fiducials, or the like.

Other approaches to automatic device to image registration utilize a cropping window, centered on either an insertion point, a patient mount unit or both, in order to rule out associated artifacts found in remote regions of the designated image, theoretically speeding up the searching algorithm itself. However, this solution may not account for artifacts that may be present within the cropping window, such as those arising from the device itself.

It is difficult to perform fast, accurate device to image registration under common scenarios where there is significant noise presented within the image.

It would be beneficial to overcome these concerns and provide automated device to image registration using fiducials through accurate and rapid detection of high intensity fiducials.

SUMMARY

According to one or more aspects of the present disclosure, a device to image registration method includes obtaining image data of a device, the device including a plurality of fiducials arranged as a fiducial frame on the device; detecting fiducial objects within the image data; cropping the image data to generate cropped image data; applying a feature enhancement to the cropped image data to enhance the fiducial objects; generating a candidate list of candidate objects based on the feature enhancement, and determining a common plane based on at least three points in the candidate list; determining a representative point for each candidate object; determining outlier candidate objects based on the common plane; determining resultant objects by extracting the outlier candidate objects from the candidate list; and registering the resultant objects to the device by matching the representative points of the resultant objects with a model of the fiducial frame.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described below with reference to the drawings.

In the present disclosure, configurations are described that can functionally implement automatic device to image registration using fiducials through accurate and rapid detection of high intensity fiducials with imaging modalities including, for example, computed tomography (CT), computed axial tomography (CAT), positron emission tomography (PET), magnetic resonance imaging (MRI), ultrasound (US), X-ray imaging, combinations or hybrids thereof, or the like. Configurations can be configured to facilitate placement of medical tools, needles or the like, and can be free standing, patient mounted, or the like. The present disclosure is not limited to any particular configuration.

An apparatus according to one or more aspects of the present disclosure can include, for example medical and non-medical configurations. The apparatus may be configured to obtain medical image data from one or more imaging arrangements that may be configured to implement image processing to define a needle trajectory by setting target and insertion point locations, and may include a two-dimensional (2D) or three-dimensional (3D) model representation of a physical guidance device to be used.

The apparatus may also include non-medical arrangements that may be configured, for example for image capturing, modeling, sensing, computer graphics, or the like.

Device to image registration processing according to one or more aspects of the present disclosure may implement functioning through use of one or more processes, techniques, algorithms, or the like, that may automatically register a virtual device model to image space.

Figure 1A:
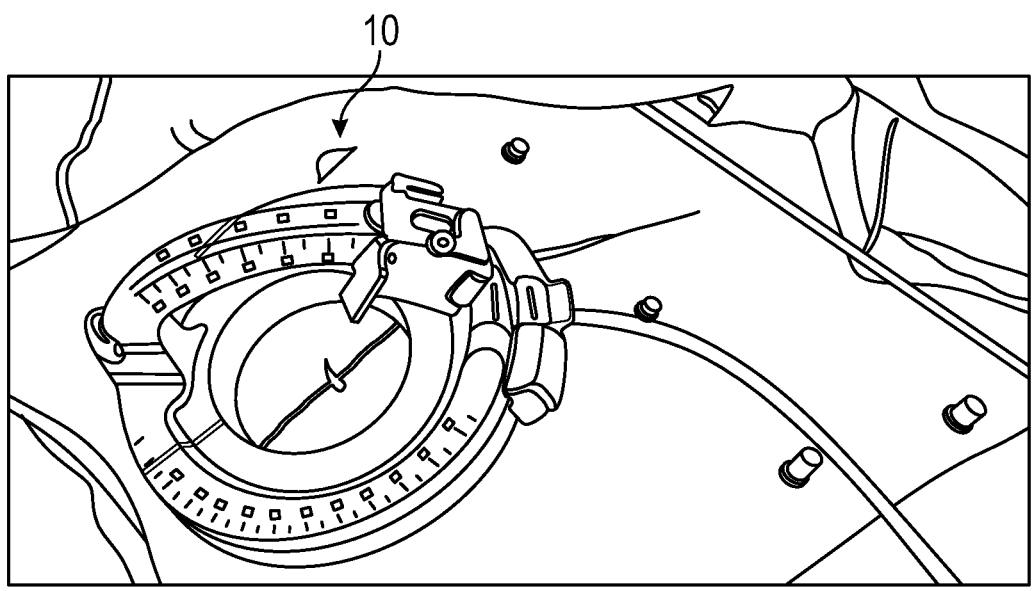
FIGS. 1A, 1B, and 1C illustrate a medical device to implement device to image registration according to exemplary aspects of the present disclosure.
Figure 1B:
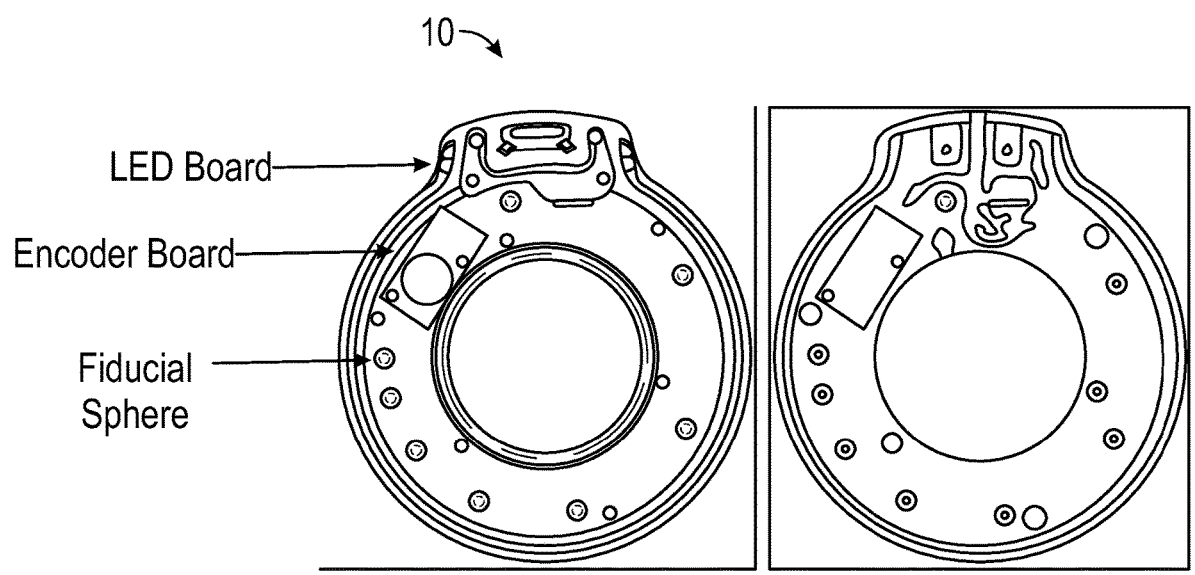
Figure 1C:
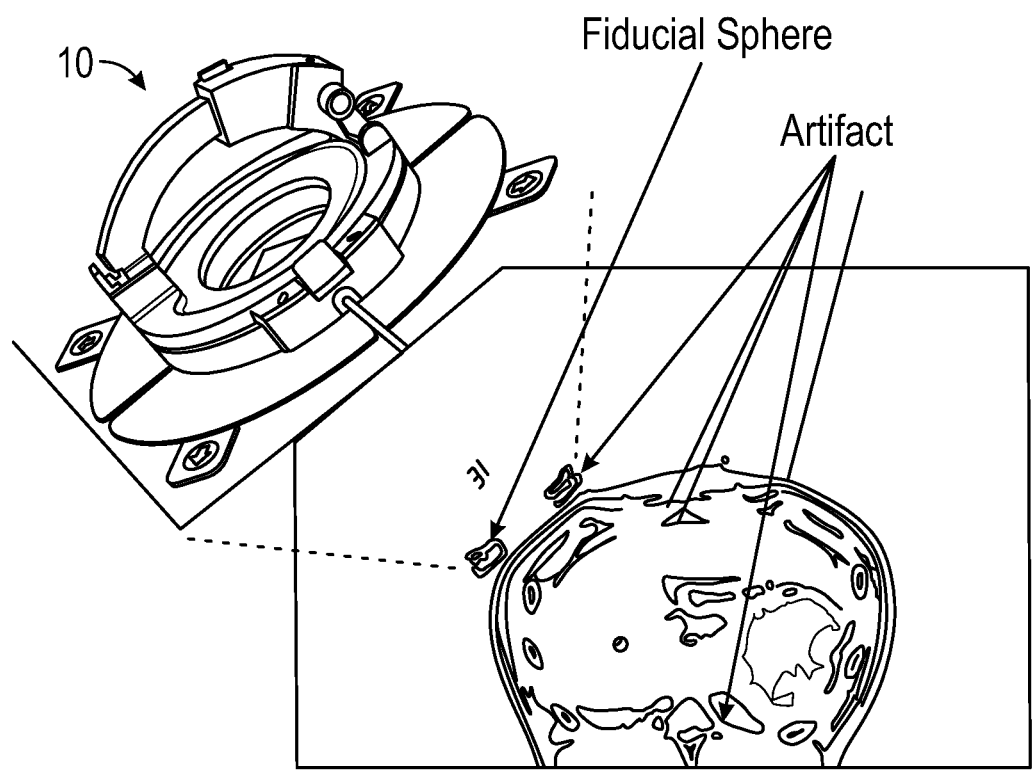

FIGS. 1A, 1B, and 1C illustrate features of an apparatus 10 configured to implement device to image registration according to one or more aspects of the present disclosure.

As shown in FIG. 1C, the apparatus 10 can be configured as a patient mount unit (PMU) and may include a base assembly and a guide. The base assembly may be configured to mount onto an object, such as a patient or the like, and the guide may be configured to include at least two degrees of freedom so as to guide a needle-like instrument to an area of interest of a patient. The apparatus 10 may be a medical device configured as a needle guide device that may be placed on a patient so a needle-like instrument may be inserted via an opening through a needle entry point of the body. The needle-like instrument may be mounted on an arc member and may be manually or automatically guided to a target area of interest through functional processing. The base assembly may be attached to the body in a desired manner including, for example tape, adhesive, or the like.

FIG. 1A illustrates the circular ring PMU on a subject that may be centered on a planned insertion point. FIG. 1B illustrates an internal view of the base assembly that may display an arrangement of fiducial spheres and circuitry or electronics that may include an LED (light emitting diode) board and an encoder board. FIG. 1C illustrates a scanned slice that shows the PMU on the subject, highlighting the high contrast fiducials along with the artifacts arising from high contrast objects on the subjects, PMU electronics, image quality, etc.

Figure 2:
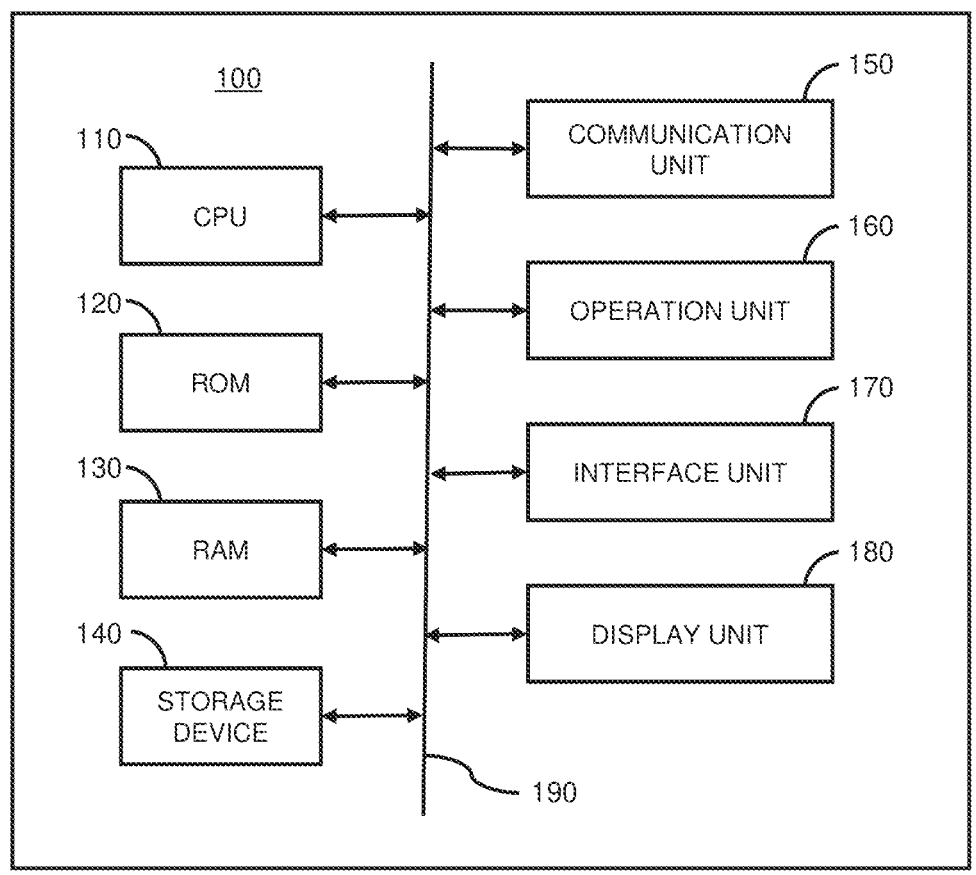
FIG. 2 illustrates a controller according to exemplary aspects of the present disclosure.
Figure 3:
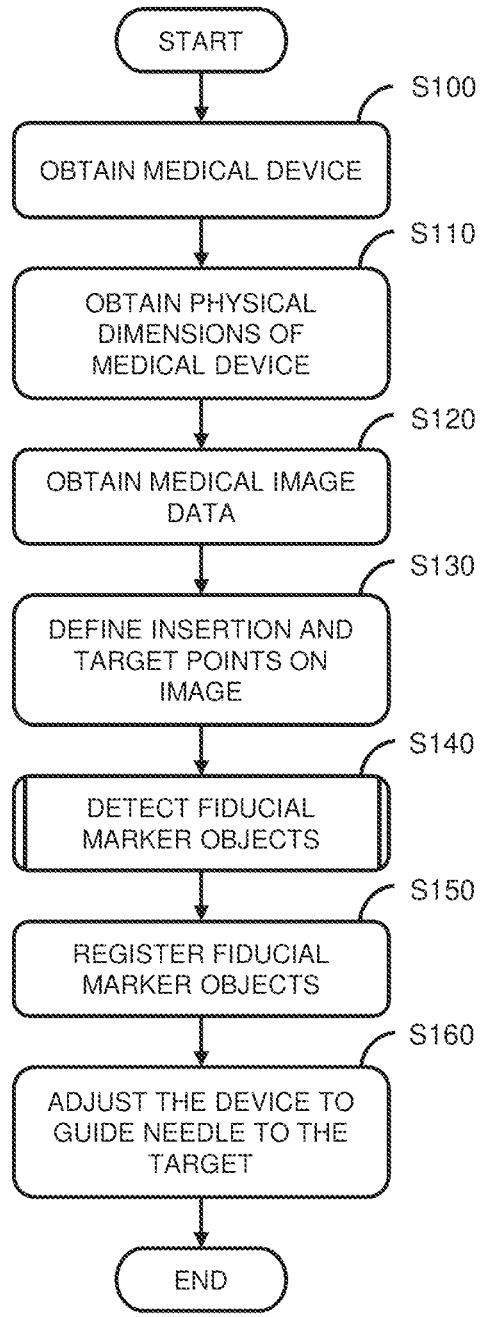
FIGS. 3 to 7 illustrate a workflow implementation for device to image registration according to exemplary aspects of the present disclosure.

FIG. 2 illustrates a controller 100 according to one or more aspects of the present disclosure. The apparatus may be interconnected with medical instruments or a variety other device, and may be controlled independently, externally, or remotely by the controller 100.

The controller 100 includes one or more configurational components including, for example, a central processing unit (CPU) 110, a read only memory (ROM) 120, a random-access memory (RAM) 130, a storage device 140, an operation unit 150, a communication unit 160, an interface unit 170, and a display unit 180. These components may be connected together by a bus 190 so that the components can communicate with each other. The bus 190 may be used to transmit and receive data between these pieces of hardware connected together, or transmit a command from the CPU no to the other pieces of hardware. The controller 100 may be implemented by one or more physical devices that may be coupled to the CPU 110 through a communication channel. For example, the controller 100 may be implemented using circuitry in the form of application specific integrated circuits (ASIC) or the like. Alternatively, the controller 100 may be implemented as a combination of hardware and software, where the software may be loaded into a processor from a memory or over a network connection. Functionality of the controller 100 may be stored on a storage medium, which may include RAM memory, magnetic or optical drive, diskette, cloud storage, or the like.

The CPU 110, which may include one or more processors and one or more memories, may be configured as a control circuit or circuitry for performing overall control of the apparatus and components connected to the apparatus. The CPU no may execute a program stored in the ROM 120 to perform control. Further, the CPU 110 may execute a display driver to control the display of the display unit 180. Further, the CPU 110 may control input and output to and from the operation unit 150.

The ROM 120 may store a program in which a procedure for control by the CPU 110 may be stored, and data. The ROM 120 may store a boot program for the controller 100 and various types of initial data. Further, the ROM 120 may store various programs for achieving the processing of the apparatus.

The RAM 130 provides a storage area for work when the CPU 110 performs control according to a command program. The RAM 130 may include a stack and a work area. The RAM 130 stores a program for executing the processing of the apparatus and the components connected to the apparatus, and various parameters for use in image processing. The RAM 130 stores a control program to be executed by the CPU 110 and temporarily stores various types of data to be used by the CPU 110 to execute various types of control.

The storage device 140 may be an auxiliary storage device for saving various types of data such as images, other image configurations, or the like. The storage device 140 may configured as a hard disk drive (HDD), a solid-state drive (SSD), a tape drive, a floppy drive, a hard disk drive, a compact disc drive, a USB, or the like.

The operation unit 150 may be configured as a mouse, a keyboard, or the like. The user may provide an operation input through the operation unit 150, and the apparatus may receive information of the operation input 150, one or more input/output devices, which may include a receiver, a transmitter, a speaker, a display, an imaging sensor, or the like, a user input device, which may include a keyboard, a keypad, a mouse, a position tracked stylus, a position tracked probe, a foot switch, a microphone, or the like.

The communication unit 160 may be configured as a circuit or other device for communicating with components included the apparatus, and with various external apparatuses connected to the apparatus via a network. For example, the communication unit 160 may store information to be output in a transfer packet and output the transfer packet to an external apparatus via the network by communication technology such as Transmission Control Protocol/Internet Protocol (TCP/IP). The apparatus may include a plurality of communication circuits according to a desired communication form.

The interface unit 170 is a connection unit for connecting to any of the components of the controller 100, or one or more input/output devices, which may include a receiver, a transmitter, a speaker, a display, an imaging sensor, or the like. A user input device, for example, may include a keyboard, a keypad, a mouse, a position tracked stylus, a position tracked probe, a foot switch, a microphone, or the like.

The display unit 180 is a display device configured, for example, as a monitor, an LCD (liquid panel display), an LED display, an OLED (organic LED) display, a plasma display, an organic electro luminescence panel, or the like. Based on the control of the apparatus, a screen may be displayed on the display unit 180 showing one or more images being captured, captured images, captured moving images recorded on the storage unit, or the like.

The controller 100 may be communicatively interconnected or interfaced with one or more external devices including, for example, one or more data storages, one or more external user input/output devices, or the like. The controller 100 may interface with other elements including, for example, one or more of an external storage, a display, a keyboard, a mouse, a sensor, a microphone, a speaker, a projector, a scanner, a display, an illumination device, or the like.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Device to image registration processing according to one or more aspects of the present disclosure may implement functioning through use of one or more processes, techniques, algorithms, or the like, that may automatically register a virtual device model to image space. The device to image registration may automatically detect fiducials embedded in a device in a calibration image for the registration of the device to the image coordinate system. The device to image registration processing may detect and register fiducials, and may overlay a model of the device and its accessible range on the image, to an operator can confirm that all targets are within a range.

FIGS. 3 to 7 illustrate features of device to image registration according to one or more aspects of the present disclosure.

Initially, an apparatus may include a device selected from various configurations including, for example, medical and non-medical arrangements. The PMU medical device of FIGS. 1A, 1B, and 1C, for example, may be selected or obtained in step S100, and may be placed or secured over a surgical site. The device can be configured as a needle guide device and placed on a patient so a needle-like instrument can be inserted via an opening through a needle entry point of the body. The needle-like instrument can be mounted on an arc member and can be manually or automatically guided to a target area of interest through functional processing. The base assembly is attached to the body in a desired manner including, for example tape, adhesive, or the like.

The device may include a plurality of fiducials, and the fiducials may be arranged as a fiducial frame on the device. In step S110, attributes of the device may be obtained or determined that may include, for example, the physical dimensions of the device, which may include the radius of the device, size of fiducials, arrangement of fiducials, arrangement of electronics, or the like. Image data of the device and attributes of the image data may be determined or obtained the device in step S120, and attributes of the image data may be determined. The image data may include MRI data, CT data, or the like. An insertion or target point may be defined in step S130, for example, in case where a user, such as a physician or other medical practitioner, may review an image along any plane and select a target point through the use of a mouse or other input device. The target point may refer to a final location that a physician or user would like to guide a needle. The fiducial marker objects within the image data may then be detected from the medical image data in step S140.

Figure 4:
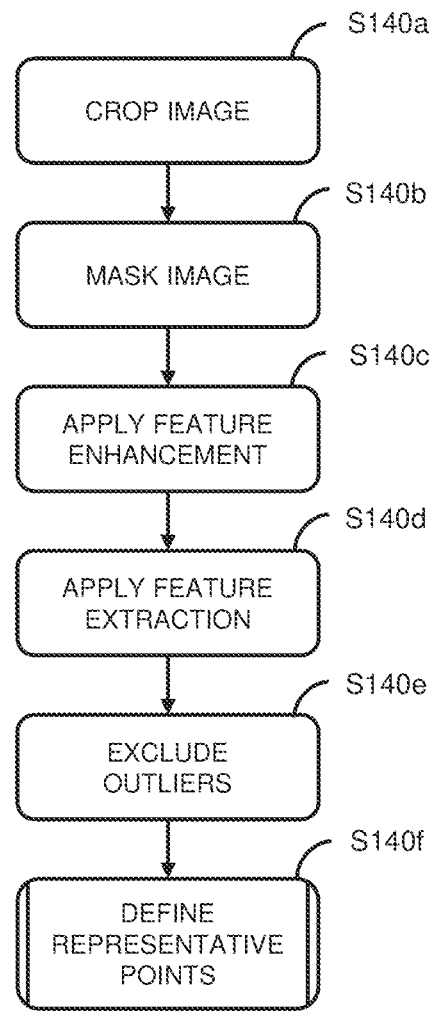

In FIG. 4, cropped image data is generated by cropping the image data in step S140*a*. The cropped image data is masked in step S140*b*. A feature enhancement is applied to the cropped image data to enhance the fiducial objects in step S140*c*, and the feature enhancement may include shape data of the fiducials. A feature extraction is applied in step S140*d*. A candidate list of candidate objects may be generated based on the feature enhancement, and a common plane may be determined based on at least three points in the candidate list. Outlier candidate objects of the resultant fiducial objects are detected or determined and extracted or excluded from the candidate list in step S140*e*. Outlier candidate objects may be detected or determined based on the common plane. A representative point for each candidate object is determined or defined in step S140*f*. The resultant objects can be registered with the device by matching the representative points of the resultant objects with a model of the fiducial frame.

The plurality of fiducials can be arranged as a fiducial frame on the device. The fiducials can be arranged on the device in a substantially planar arrangement, and the arrangement may be ring independent and asymmetric. The fiducials can be arranged in a ring shape, and the resultant objects may be registered with the device by rotating the ring shape until the representative points of the resultant objects match the model of the fiducial frame.

Figure 5:
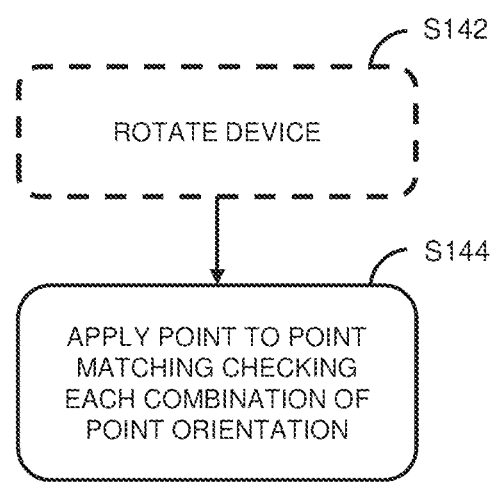

As illustrated in FIG. 5, a fiducial ring may be rotated or flipped in step S142. This may be a full or partial rotation or a 180° flip. Then, a point-to-point mapping may be applied in step S144. From the data in the point-to-point matching, the virtual model of the device may be aligned with the fiducial locations found within the image. The device may be adjusted to guide the needle to the target location.

Figure 6:
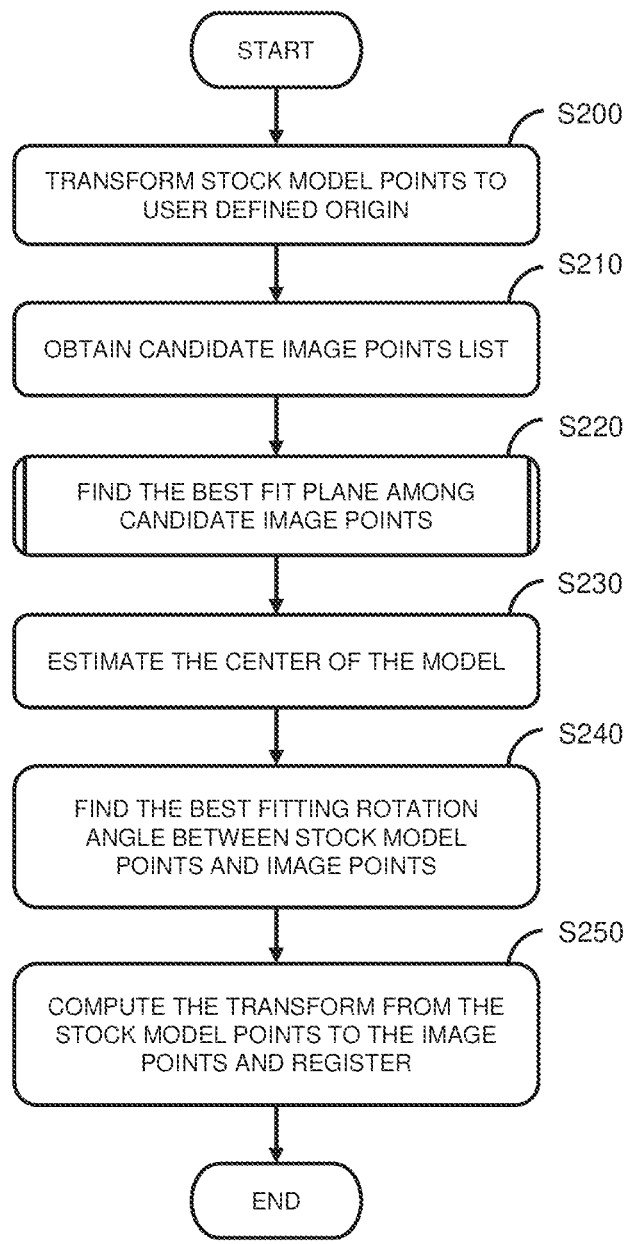

In FIG. 6, the representative points are defined or determined by finding a common plane from a subset of the candidate list, and determining whether other points on the candidate list fit the plane. In step S200, the representative points can be determined by transforming stock model points to a user defined origin. In step S210, a candidate image points list is obtained or generated. In step S220, a best fit plane among candidate image points is determined and a center of the model is estimated by choosing k number of points that best fit the plane for a given number of candidate fiducials (N). For example, in step S220a in FIG. 7, choose k points (k≥1), determine their level of coplanarity, and find the k points that are most in the plane. Match the remaining points on the list to that plane and remove all points that are not on the plane in step S220b. Find the best fitting rotation angle between stock model points and image points in step S240, and compute or determine the transform from the stock model points to the image points in step S250. Registration can then be made.

The representative points can be determined by transforming stock model points to a user defined origin, and generating a candidate image points list. A common plane may be determined from a subset of the image points list, and a determination may be made as to whether other points on the image points list fit the plane. A best fit among the candidate image points list and a center of the model may be determined by choosing k number of points that best fit the plane for a given number of candidate fiducials (N), and matching remaining candidate points on the plane. A best fitting rotation angle may be determined or found between the stock model points and the resultant objects by computing a transform between the stock model points and the resultant objects, and registering the transform. The best fitting rotation angle may be determined between the stock model points and the resultant objects. The transform may be determined or calculated between the stock model points and the resultant objects, and registration may take place.

The fiducials may be arranged in a substantially planar arrangement. The fiducials may be arranged as ring independent and asymmetric. The fiducials may be arranged in a ring shape, and the fiducial objects may be registered by rotating the ring shape until the representative points of the fiducial markers match the model of the frame. The image data may be masked. The feature enhancement may include shape data of the fiducials. Feature extraction may be applied to the cropped image data to extract the fiducial objects by generating candidate fiducials. The feature extraction may extract the fiducial objects by generating candidate fiducials based on the feature enhancement by applying a derivative-based operation to the cropped image data. The device may be rotated, and point to point matching may be applied by checking each combination of point orientation. The device may be used to guide a needle to a target.

One or more methods can be used for plane fitting and outlier detection. For example, registration may be achieved with metrics including, for example, root mean square registration in an iterative process for removing outliers.

A sample line, for example, can be selected that runs through a point of intersection of an axis of rotation of the frame and a target surface (e.g. skin surface) of a subject as may be indicated in a virtual representation the scan data. A plurality of points along the line can be selected. For each such point, the scan data can be sampled. The sampled data can include data representing a small region surrounding the point, for example, in a small sphere centered on (or otherwise including) the point. Accordingly, the sampled data of such a point can include data representing locations in a neighborhood around the sample point, and accordingly, mathematical attributes, such the gradient derivative of data values in the neighborhood, of the sampled data of the point can be used to determine attributes of the point. An example of such is computing a gradient derivative (commonly called the gradient) $\nabla f$ of values f of the sample data in the neighborhood around the sample point.

For example, a metric can be made of the virtual representation of the device superimposed on the scan data. For example, the gradient $\nabla f$ in a respective neighborhood of each of the sampled points along the sample line can be determined. In a case where the gradient $\nabla f$ is a constant (such as zero) or close thereto throughout such a neighborhood, then the sample point may most likely lie in the air over or adjacent to the subject, but may not lie on the surface of or inside the subject, as values of scan data in air may typically be very close in value because the density, temperature, and other physical parameters detectible by the scan do not change much in the air around the subject. That is, most values of scan data that come from points in the air around the subject may typically be about the same in value, and hence result in little change in the gradient $\nabla f$. The value of the gradient $\nabla f$ may be approximately zero throughout a neighborhood around a sample point in the air. If the gradient $\nabla f$ includes a sharp change in values along a line or plane in the neighborhood, then sample point may most likely lie or very close to the surface of the subject, with the sharp change in values at such line or plane occurring at the surface of the subject. If the gradient $\nabla f$ includes small changes in values in the neighborhood but does not include a sharp change in values, then the sample point may most likely lie inside the patient, with the small changes values of the gradient representing changes in the nature of the tissues of the subject throughout such neighborhood, such as for example, changes in value of the gradient $\nabla f$ which may occur at membranes or blood vessels in muscle or deep portions of the skin of the subject. For each such point along the sample line, the sample point may be determined as whether it likely represents a point on or very close to the surface of the subject. The number of sample points on the sample line that lie on or very close to the surface of the subject may be counted. If that count meets or exceeds a preselected value (such three) then the virtual representation of the device may be determined to lie on the surface of the subject as represented by the scan data.

To detect the fiducial marker objects, the image may be cropped in step S140a in FIG. 4 along a window centered on a reference point, for example, the insertion point. The window may include a physical device. In step S140b, the image may be masked in locations that may be known a priori of possible artifacts, for example, needle artifacts. Steps of feature enhancement and extraction may be implemented in steps S140c and S140d where a derivative-based operation may be applied to the data in order to generate a list of candidate fiducials was well as their locations within the image. Points from this list may be used to calculate a common plane and outliers may be removed. The plane commonality calculation may preferably use at least three points. Three vectors defined below (v1, v2, v3) using Equations 1 may be determined to be coplanar in a case where a scalar product (v1·(v2×v3)) is equal to zero (0).

Equations 1

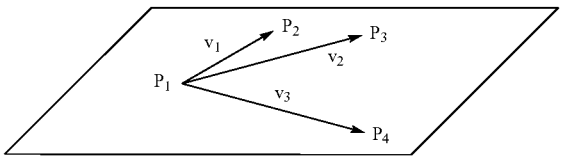

$$v_1 = (x_2 - x_1)i + (y_2 - y_1)j + (z_2 - z_1)k$$
$$v_2 = (x_3 - x_1)i + (y_3 - y_1)j + (z_3 - z_1)k$$
$$v_3 = (x_4 - x_1)i + (y_4 - y_1)j + (z_4 - z_1)k$$

Representative points, which may be represented as additional points that lie within the plane may be calculated as the distance (d) of the point from the plane using Equation 2.

$$d = \frac{|Ax_n + By_n + Cz_n + D|}{\sqrt{A^2 + B^2 + C^2}} = 0 \qquad \text{Equation 2}$$

The plane may be defined as Ax+By+Cz+D=0.

Outliers may be characterized as any points on the candidate fiducial list that have a non-zero distance and do not lie on the plane. Once these outlier points are removed from the candidate list, registration with the device may take place with the remaining points on the list, and may now be assumed to contain all real fiducials. The fiducial ring may be rotated or flipped in step S142 in FIG. 5. This may be a full or partial rotation or a 180° flip. Then, a point-to-point mapping may be applied in step S144. From the data in the point-to-point matching, the virtual model of the device may be aligned with the fiducial locations found within the image. The device may be adjusted to guide the needle to the target location.

The outlier detection according to one or more aspects of the present disclosure includes features that differ from and are unique to outlier detection techniques that may currently be implemented. For example, the outlier detection implementation illustrated in FIGS. 4 and 5 correspond to use of an interactive approach, where a registration transform is created from all the points in the candidate list, and each point on the list is sequentially verified through various thresholds and checks. Upon failure at any of these designated checks, the point is removed, the transform is recalculated, and the next point on the list is verified. This process is repeated for every point on the candidate list. This workflow may have difficulty in conditions where a high number of artifacts are mistaken for candidate fiducials. In this scenario, the registration transform may be skewed by these artifacts, to the point where real fiducials, which are in the minority, may be regarded as outliers and removed from the candidate list. As each of these points are removed, the registration transform may become more skewed towards accepting these artifacts, making it more likely that subsequent points that are real fiducials are removed. In this instance, the registration transform may lead to an incorrect result. Another potential downside may be that the plane transform calculation, as well as the associated checks may be calculated every single time through the loop, possibly increasing the time for registration. Other methods, such as virtual skin detection to pre-define a potential plane before the outlier detection is performed, may be a way to avoid the above-described potential registration failure.

Figure 7:
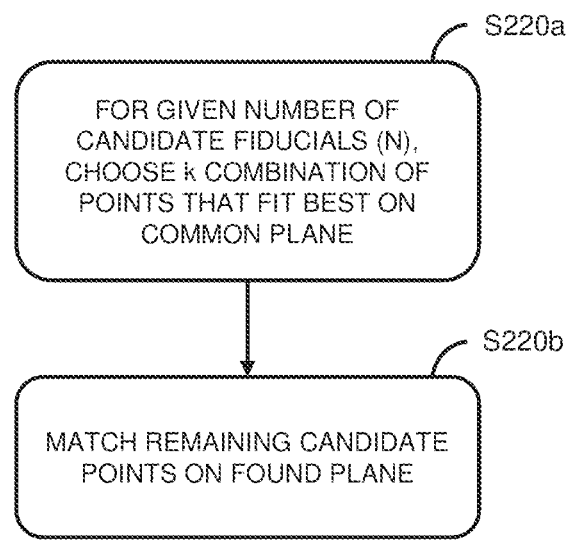

A workflow for outlier detection according to one or more aspects of the present disclosure is shown in FIGS. 6 and 7.

Stock model points are transformed to a user defined origin in step S200, where the locations of the fiducials may be transformed in the virtual model to the user defined origin, i.e., the insertion point. The candidate image points list may be determined or obtained in step S210. A best fit plane among candidate image points may be obtained in step S220. A center of the model may be estimated in step S230. An angle may be determined or found in step S240 that may be the best fitting rotation angle between the stock model points and the image points. The fiducial marker objects may be registered in S250. The transform from the stock model points to the image points may be computed or determined, and the image points may be registered in step S260.

As illustrated in FIG. 7, to determine a best fit among candidate points, for a given number of candidate fiducials (N) from the candidate image points list, k points may be chosen in step S220a where k is greater than three (k≥3), their level of coplanarity may be determined, and the k points may be found that fit best on a common plane, are most in plane, or are arranged in a substantially planar arrangement. In step S220b, the remaining points on the list may be matched to that plane and all points may be removed that are not on the plane. The best fitting rotation angle may be found between the virtual model and the candidate image points in step S240. The transform may then be computed in S450.

Figures 8A, 8B, 8C:
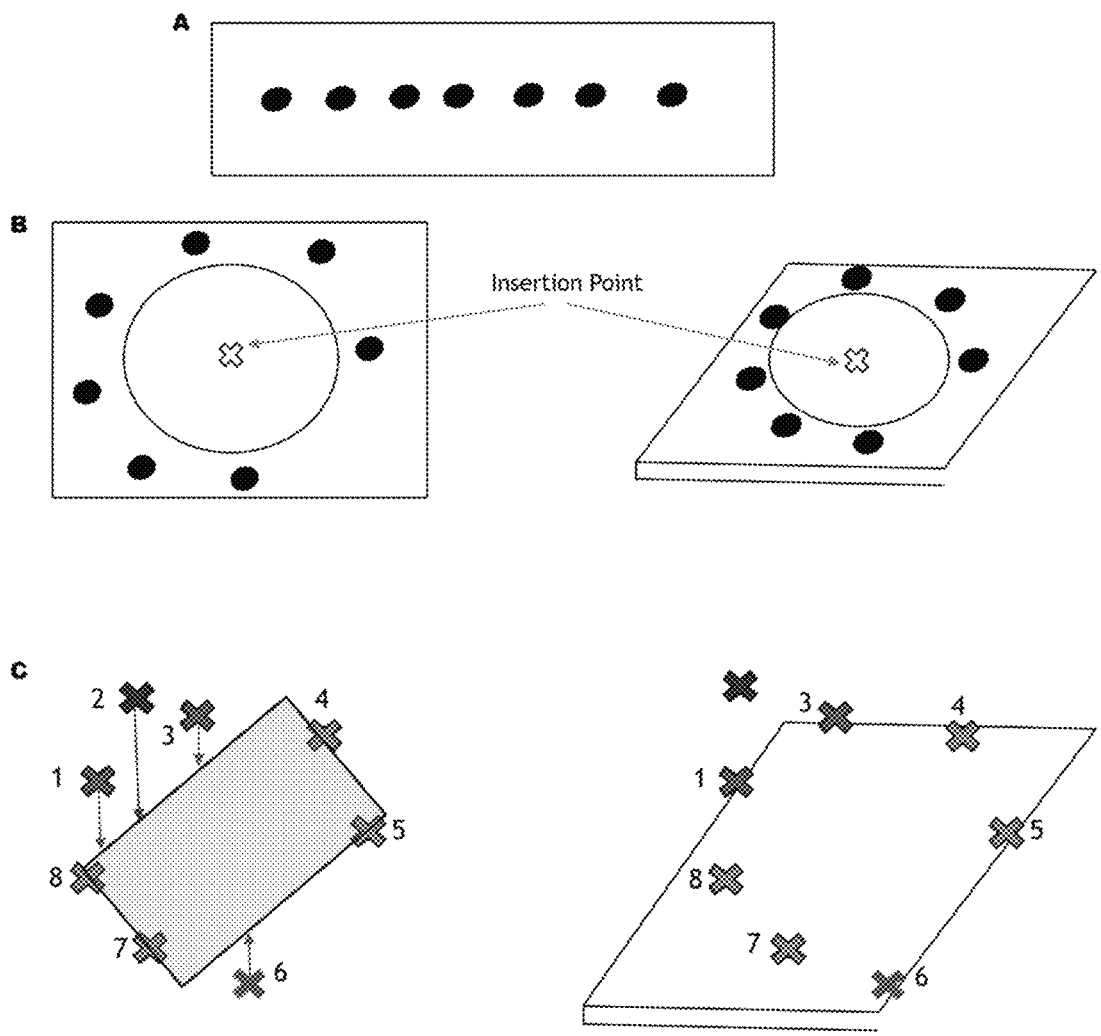
FIGS. 8A, 8B, and 8C illustrates a first embodiment according to the present disclosure.

FIGS. 8A, 8B and 8C illustrate a first embodiment according to one or more aspects of the present disclosure. The apparatus 10 of FIG. 1C may implement the first embodiment. In FIG. 8A, a side view of the PMU with fiducials are aligned along a common plane. In FIG. 8B, the left illustrates a top-down view of fiducials arranged as a ring around the device. In FIG. 8B, the right illustrates a top side view of fiducials arranged as a ring around the device, with the insertion point in the center. The left of FIG. 8C illustrates image points (numbered) that are detected within the image. A best fit plane found using four points is shown. The distance of remaining points to the common plane may be calculated. Green points are found to be on the plane. Blue point found outside the plane in FIG. 8C right. A top side view of fiducials may be found on the plane in the right of FIG. 8C.

From the candidate list, all combinations of three (3) points may be chosen and the plane may be calculated. Each remaining point on the candidate list may be matched to the plane. The points that do not lie along the plane may be removed from the list.

Figure 9:
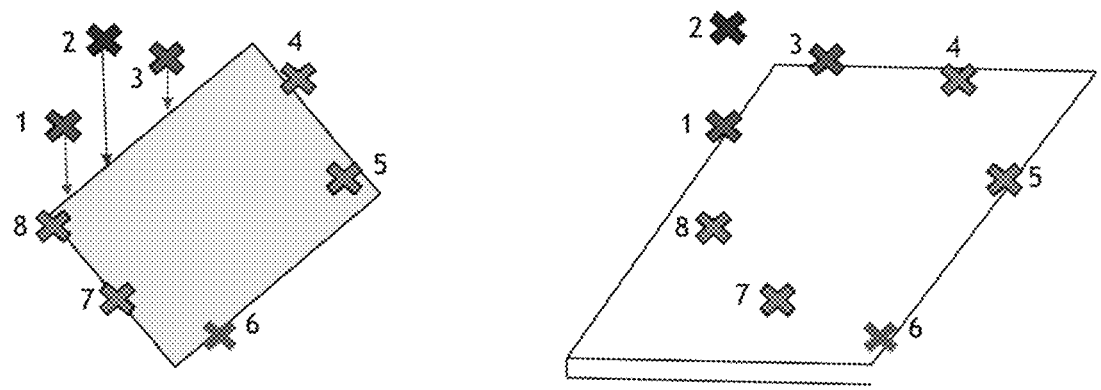
FIG. 9 illustrates a second embodiment according to the present disclosure.

FIG. 9 illustrates a second embodiment according to one or more aspects of the present disclosure. Image points in the left (numbered) may be detected within the image. A best fit plane may be found using points 4-8 that is greater than three (k>3). The distance of remaining points to the common plane may be calculated. Points 1 and 3 may be found to be on the plane. Point 2 may be found to be outside the plane. In the right, FIG. 9 illustrates a top side view of fiducials found on the plane.

From the candidate list, all combinations of the points (k>3) may be chosen and the plane may be calculated. FIG. 9 illustrates k=5. The best fit plane combination may be found. Each remaining point on the candidate list may be matched to the plane. Points that do not lie along the plane may be removed. In general, for a fixed candidate list with size n, in cases where k increases, the number of possible combinations decreases, and may result in faster processing through calculation, algorithm, or the like.

Figures 10A, 10B, 10C, 10D:
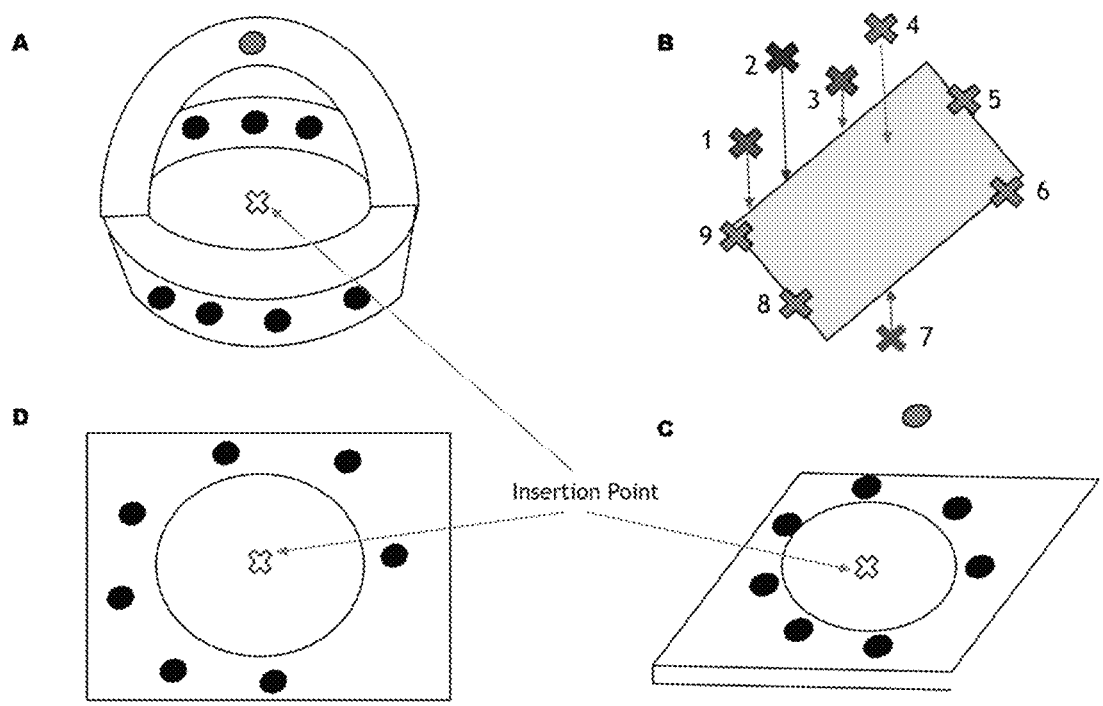
FIGS. 10A to 10D illustrate a third embodiment according to the present disclosure.

FIGS. 10A to 10D illustrate fiducials in an arc as a third embodiment according to one or more aspects of the present disclosure. In FIG. 10A, fiducials are arranged within a physical device. One fiducial may be found on the arc. In FIG. 10B, image points (numbered) may be detected within the image. A best fit plane may be found using the four points 5, 6, 8 and 9. The distance of remaining points to the common plane may be calculated. Consider points 1, 3 and 7 as green, point 2 as blue, point 4 as yellow, and points 5, 6, 8 and 9 as red. Green points 1, 3 and 7 may be found to be on the plane. The blue and yellow points 2 and 4 representing image point corresponding to fiducials on the arc may be found to be outside of the plane. In FIG. 10C, a top side view of fiducials is shown arranged as a ring around the device, showing the fiducials in the arc, with the insertion point at the center. FIG. 10D illustrates a top-down view of fiducials arranged as a ring around the device, with the insertion point at the center.

From the candidate list, all combinations of three points may be chosen and the plane may be calculated. The best fit plane combination may be found. Each remaining point on the candidate list may be matched to the plane through trial and error, where verification of finding the orientation may be found with a lowest root mean square computation. The orientation may be found by having a fiducial on the arc and determining its position with respect to the common plane.

Figure 11A:
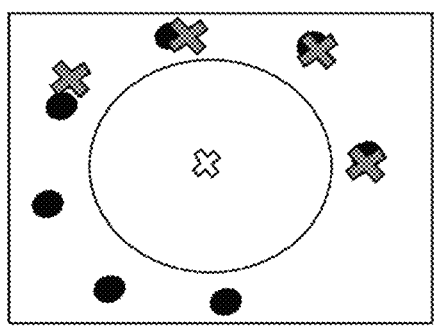
FIGS. 11A and 11B illustrate clinical aspects according to exemplary aspects of the present disclosure.
Figure 11B:
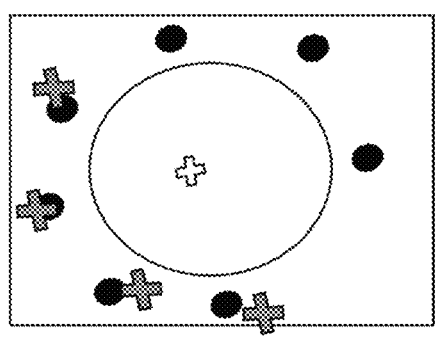

FIGS. 11A and 11B illustrate clinical scenarios according to exemplary aspects of the present disclosure. In clinical scenarios where there may be a lot of noise, it may not be unexpected to be missing image point locations for corresponding fiducials, for example where only four (4) image points may be picked up due to the criteria set by an algorithm even though there may be seven (7) fiducials. In these cases, or in cases where the estimated center of the fiducial may not be exact, there may be multiple solutions, which may lead to registration error. In the current ring embodiment, the arrangement of the fiducials may be asymmetric in order to guard against this possibility, but it may only be effective if all of the fiducial points have corresponding image points, which may not be assumed to be true in all situations.

Some configurations, as described below, may take this challenge into account, by having fiducials arranged in multiple planes with respect to each other in order to help properly orient the stock model points with the image points (the fourth embodiment), and embodiments where more fiducials and fiducial planes may be present (the fifth embodiment), in order to lower the probability that a missed detection of any single point may cause a steep drop in registration accuracy.

Figure 12:
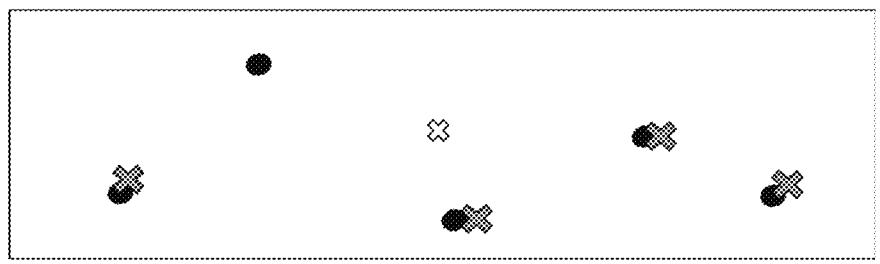
FIG. 12 illustrates plane detection according to exemplary aspects of the present disclosure.

FIG. 12 illustrates plane detection according to exemplary aspects of the present disclosure. While the disclosure so far has been involving ring orientation of fiducials, plane detection may also be possible for non-ring configurations, which may be more effective in constraining solutions for cases of a missed fiducial.

For example, a top side view of a PMU with fiducials (circles) are aligned in an asymmetric non ring shape with image point overlay (plus signs). In this case, only 4 out of 5 possible image points are detected.

Figure 13A:
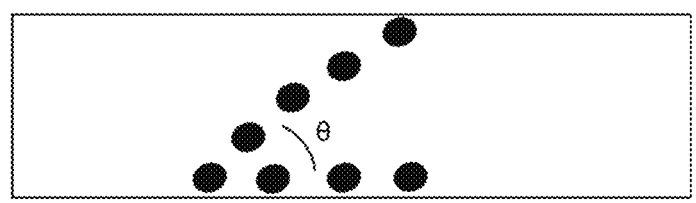
FIGS. 13A and 13B illustrate a fourth embodiment according to the present disclosure.
Figure 13B:
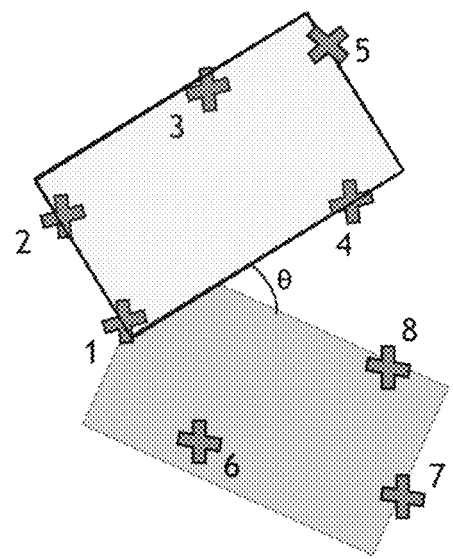

FIGS. 13A and 13B illustrate a fourth embodiment according to the present disclosure. FIG. 13A shows a side view of the PMU with fiducials aligned along two planes, sharing a common axis, and oriented with respect to each other by a common angle $\theta$. FIG. 13B illustrates image points detected within the image. Best fit planes may be found using the image points.

From the candidate list, points may be found that segregate into both planes. Best fit orientation may be found between the model points and image points, where two common planes may be separated by a known angle within the physical device. By knowing the orientation of planes with respect to each other, a determination may be made as to whether the physical device is flipped or orientated upright within the image by analyzing the layout of the image points from the candidate list.

Figure 14A:
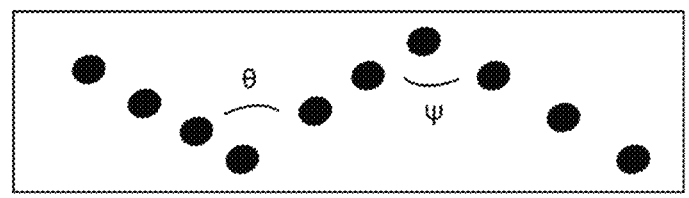
FIGS. 14A and 14B illustrate a fifth embodiment according to the present disclosure.
Figure 14B:
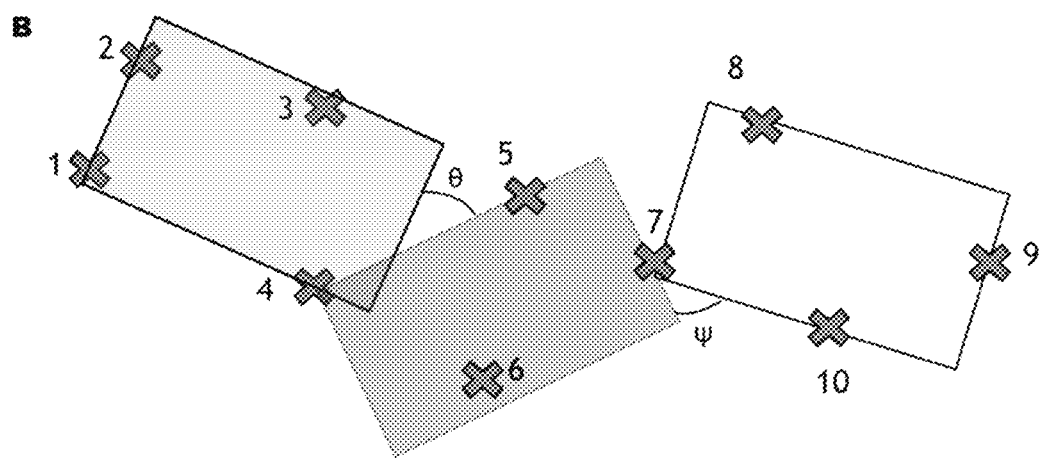
Figure 15:
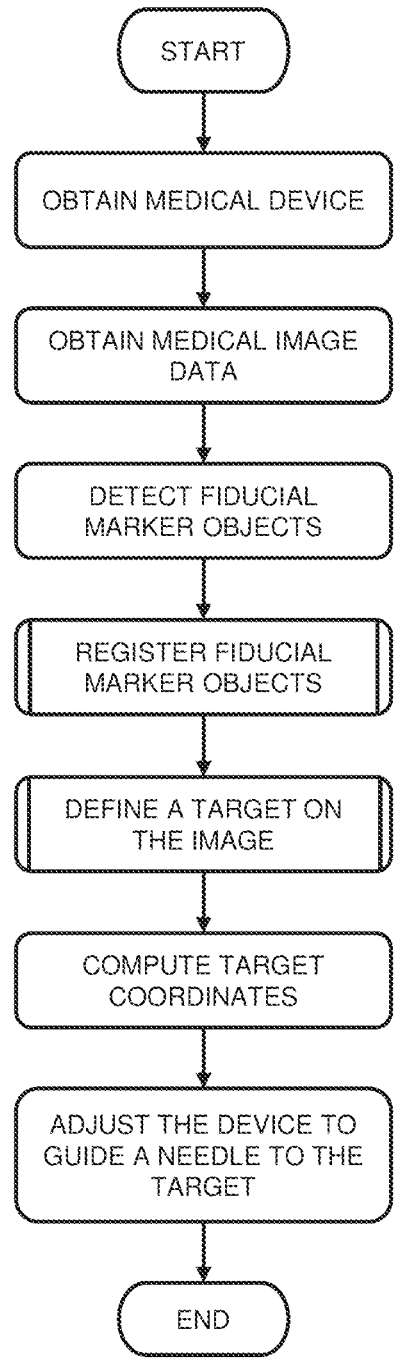
FIGS. 15 to 19 illustrate a standard workflow implementation for device to image registration.
Figure 16:
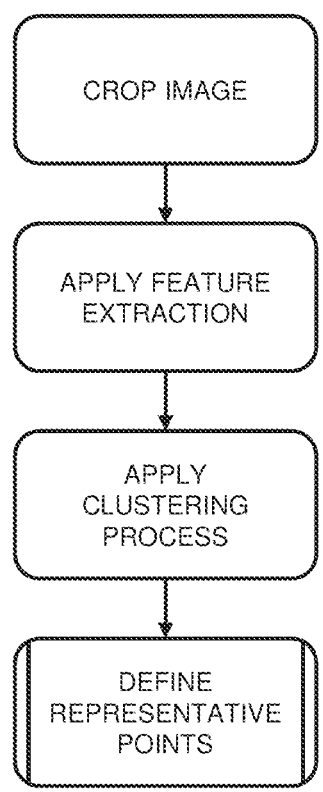
Figure 17:
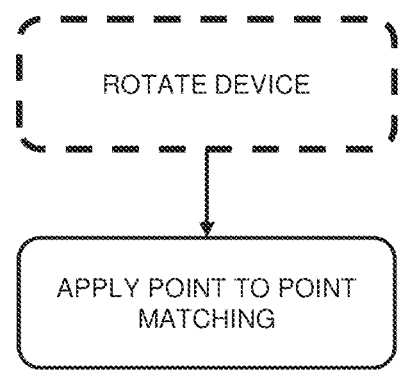
Figure 18:
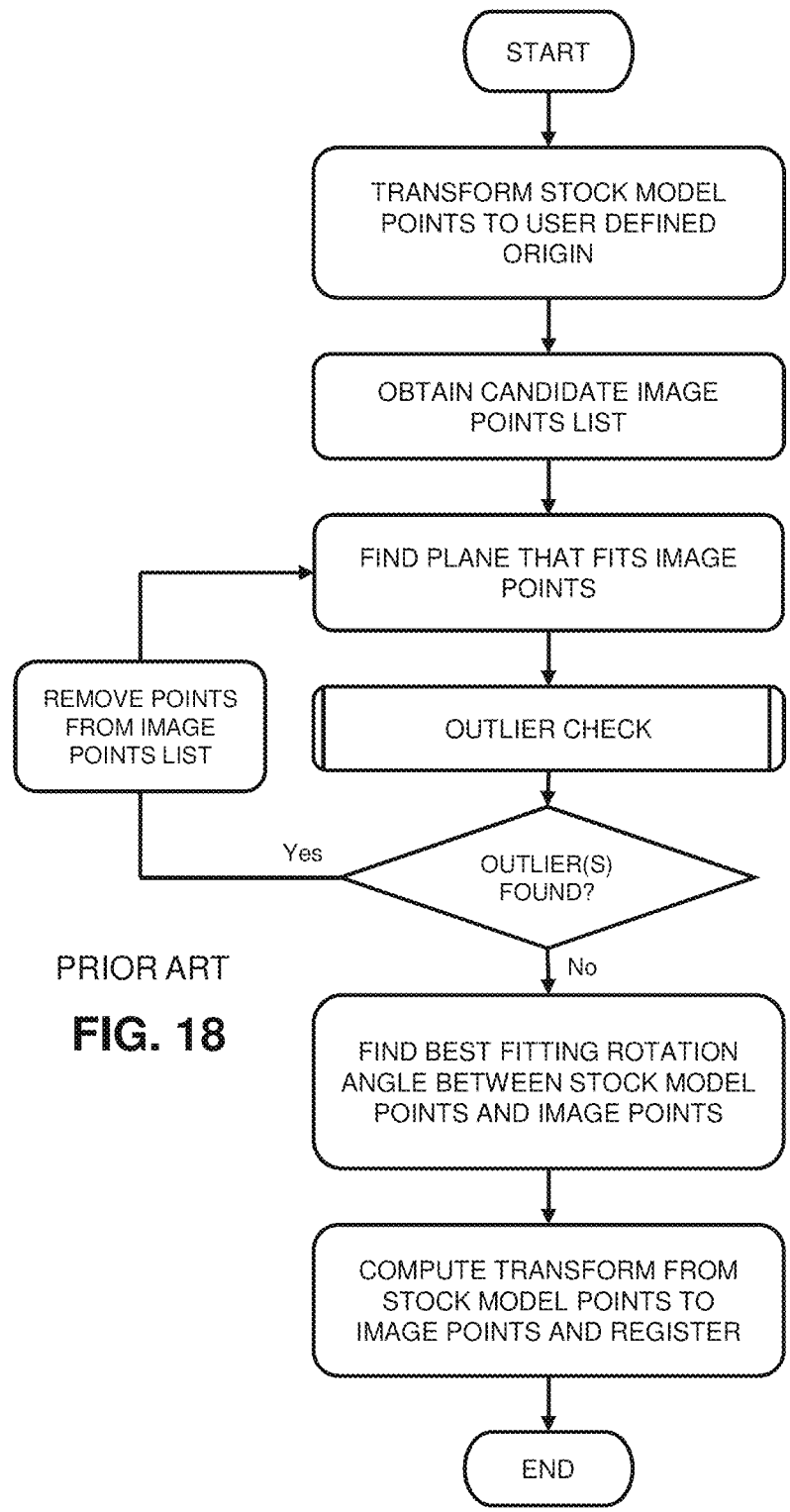
Figure 19:
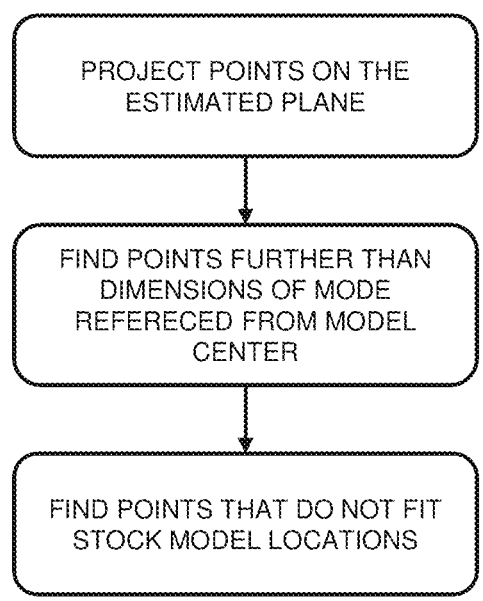

FIGS. 14A and 14B illustrate a fifth embodiment according to the present disclosure. FIG. 14A shows a side view of the PMU with fiducials aligned along three planes, sharing a common axis, and oriented with respect to each other by common angles $(\theta, \psi)$. FIG. 14B illustrates image points detected within the image. Best fit planes may be found using the image points.

From the candidate list, points may be found that segregate into the three planes. Best fit orientation may be found between the model points and image points, where three common planes may be separated by known angles within the physical device. By knowing the orientation of planes with respect to each other, a determination may be made as to whether the physical device is flipped or orientated upright within the image by analyzing the layout of the image points from the candidate list.

According to one or more aspects of the present disclosure, device to image registration may include obtaining image data of a device, the device including a plurality of fiducials arranged as a fiducial frame on the device; detecting fiducial objects within the image data; cropping the image data to generate cropped image data; applying a feature enhancement to the cropped image data to enhance the fiducial objects, the feature enhancement including shape data of the fiducials; generating a candidate list of candidate objects based on the feature enhancement, and determining a common plane based on at least three points in the candidate list; determining a representative point for each candidate object; determining outlier candidate objects based on the common plane; determining resultant objects by extracting the outlier candidate objects from the candidate list; and registering the resultant objects to the device by matching the representative points of the resultant objects with a model of the fiducial frame.

According to one or more aspects of the present disclosure, the representative points may be determined by transforming stock model points to a user defined origin, and generating a candidate image points list. A common plane may be determined from a subset of the image points list, and a determination may be made as to whether other points on the image points list fit the plane. A best fit among the candidate image points list and a center of the model may be determined by choosing k number of points that best fit the plane for a given number of candidate fiducials (N), and matching remaining candidate points on the plane. A best fitting rotation angle may be determined or found between the stock model points and the resultant objects by computing a transform between the stock model points and the resultant objects, and registering the transform. The best fitting rotation angle may be determined between the stock model points and the resultant objects. The transform may be determined or calculated between the stock model points and the resultant objects, and registration may take place.

Features of the present disclosure may provide a variety of technological improvements including, for example, ways to register accurate using images with noise and artifacts, even within cropping windows. The reduction of computational time, and alternatives to RMS calculation for best fit orientation between model points and image points represent other technological improvements that may be provided by the present disclosure. Various modifications and alterations based on the present disclosure may become apparent to those skilled in the art, and the features of the present disclosure may be applied to one or more configurational arrangements including, for example, CT, CAT, PET, MRI, US, X-ray imaging, combinations or hybrids thereof, or the like.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard-disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A device to image registration method comprising:
   obtaining image data of a device, the device including a plurality of fiducials arranged as a fiducial frame on the device;
   detecting fiducial objects within the image data;
   cropping the image data to generate cropped image data;
   applying a feature enhancement to the cropped image data to enhance the fiducial objects;
   generating a candidate list of candidate objects based on the feature enhancement, and determining a common plane based on at least three points in the candidate list;
   determining a representative point for each candidate object;
   determining outlier candidate objects based on the common plane;
   determining resultant objects by extracting the outlier candidate objects from the candidate list; and
   registering the resultant objects to the device by matching representative points of the resultant objects with a model of the fiducial frame.

2. The device to image registration method according to claim 1, wherein the representative points are determined by transforming stock model points to a user defined origin, and generating a candidate image points list.

3. The device to image registration method according to claim 2, further comprising:
   determining a common plane from a subset of the candidate image points list; and
   determining whether other points on the candidate image points list fit the plane.

4. The device to image registration method according to claim 3, further comprising:
   determining a best fit among the candidate image points list and a center of the model by choosing k number of points that best fit the plane for a given number of candidate fiducials (N); and
   matching remaining candidate points on the plane.

5. The device to image registration method according to claim 2, further comprising:
   finding a best fitting rotation angle between the stock model points and the resultant objects;
   computing a transform between the stock model points and the resultant objects; and
   registering the transform.

6. The device to image registration method according to claim 5, wherein the best fitting rotation angle is determined between the stock model points and the resultant objects.

7. The device to image registration method according to claim 5, wherein the transform is determined or calculated between the stock model points and the resultant objects, and registration takes place.

8. The device to image registration method according to claim 1,
   wherein the fiducials are arranged in a substantially planar arrangement.

9. The device to image registration method according to claim 1,
   wherein the fiducials are arranged as ring independent and asymmetric.

10. The device to image registration method according to claim 1,
    wherein the fiducials are arranged in a ring shape, and the fiducial objects are registered by rotating the ring shape until the representative points of the fiducial markers match the model of the fiducial frame.

11. The device to image registration method according to claim 1, further comprising masking the image data.

12. The device to image registration method according to claim 1, wherein the feature enhancement is based on shape data of the fiducials.

13. The device to image registration method according to claim 1, further comprising applying feature extraction to the cropped image data to extract the fiducial objects by generating candidate fiducials.

14. The device to image registration method according to claim 1, wherein the feature extraction extracts the fiducial objects by generating candidate fiducials based on the feature enhancement by applying a derivative-based operation to the cropped image data.

15. The device to image registration method according to claim 1, further comprising rotating the device, and applying point to point matching by checking each combination of point orientation.

16. The device to image registration method according to claim 1, further comprising adjusting the device to guide a needle to a target.

17. A device to image registration apparatus comprising:
    at least one processor configured to perform:
    obtaining image data of a device, the device including a plurality of fiducials arranged as a fiducial frame on the device;
    detecting fiducial objects within the image data;
    cropping the image data to generate cropped image data;
    applying a feature enhancement to the cropped image data to enhance the fiducial objects;

generating a candidate list of candidate objects based on the feature enhancement, and determining a common plane based on at least three points in the candidate list;

determining a representative point for each candidate object;

determining outlier candidate objects based on the common plane;

determining resultant objects by extracting the outlier candidate objects from the candidate list; and registering the resultant objects to the device by matching the representative points of the resultant objects with a model of the fiducial frame.

18. The device to image registration apparatus according to claim 17, wherein the representative points are determined by transforming stock model points to a user defined origin, and generating a candidate image points list.

19. The device to image registration apparatus according to claim 18, wherein the at least one processor is further configured to perform:

determining a common plane from a subset of the candidate image points list; and determining whether other points on the candidate image points list fit the plane.

20. The device to image registration apparatus according to claim 19, wherein the at least one processor is further configured to perform:

determining a best fit among the candidate image points list and a center of the model by choosing k number of points that best fit the plane for a given number of candidate fiducials (N); and matching remaining candidate points on the plane.

21. A non-transitory storage medium storing a program for causing a computer to execute a method of registration comprising:

obtaining image data of a device, the device including a plurality of fiducials arranged as a fiducial frame on the device;

detecting fiducial objects within the image data;

cropping the image data to generate cropped image data;

applying a feature enhancement to the cropped image data to enhance the fiducial objects;

generating a candidate list of candidate objects based on the feature enhancement, and determining a common plane based on at least three points in the candidate list;

determining a representative point for each candidate object;

determining outlier candidate objects based on the common plane;

determining resultant objects by extracting the outlier candidate objects from the candidate list; and registering the resultant objects to the device by matching representative points of the resultant objects with a model of the fiducial frame.

22. The storage medium according to claim 21, wherein the representative points are determined by transforming stock model points to a user defined origin, and generating a candidate image points list.

23. The storage medium according to claim 22, further comprising:

determining a common plane from a subset of the candidate image points list; and determining whether other points on the candidate image points list fit the plane.

24. The storage medium according to claim 23, further comprising:

determining a best fit among the candidate image points list and a center of the model by choosing k number of points that best fit the plane for a given number of candidate fiducials (N); and matching remaining candidate points on the plane.

* * * * *